Aug. 4, 1953  A. A. ERICSON  2,647,371
HYDRAULIC MACHINE TOOL DRIVE
Filed Dec. 9, 1944
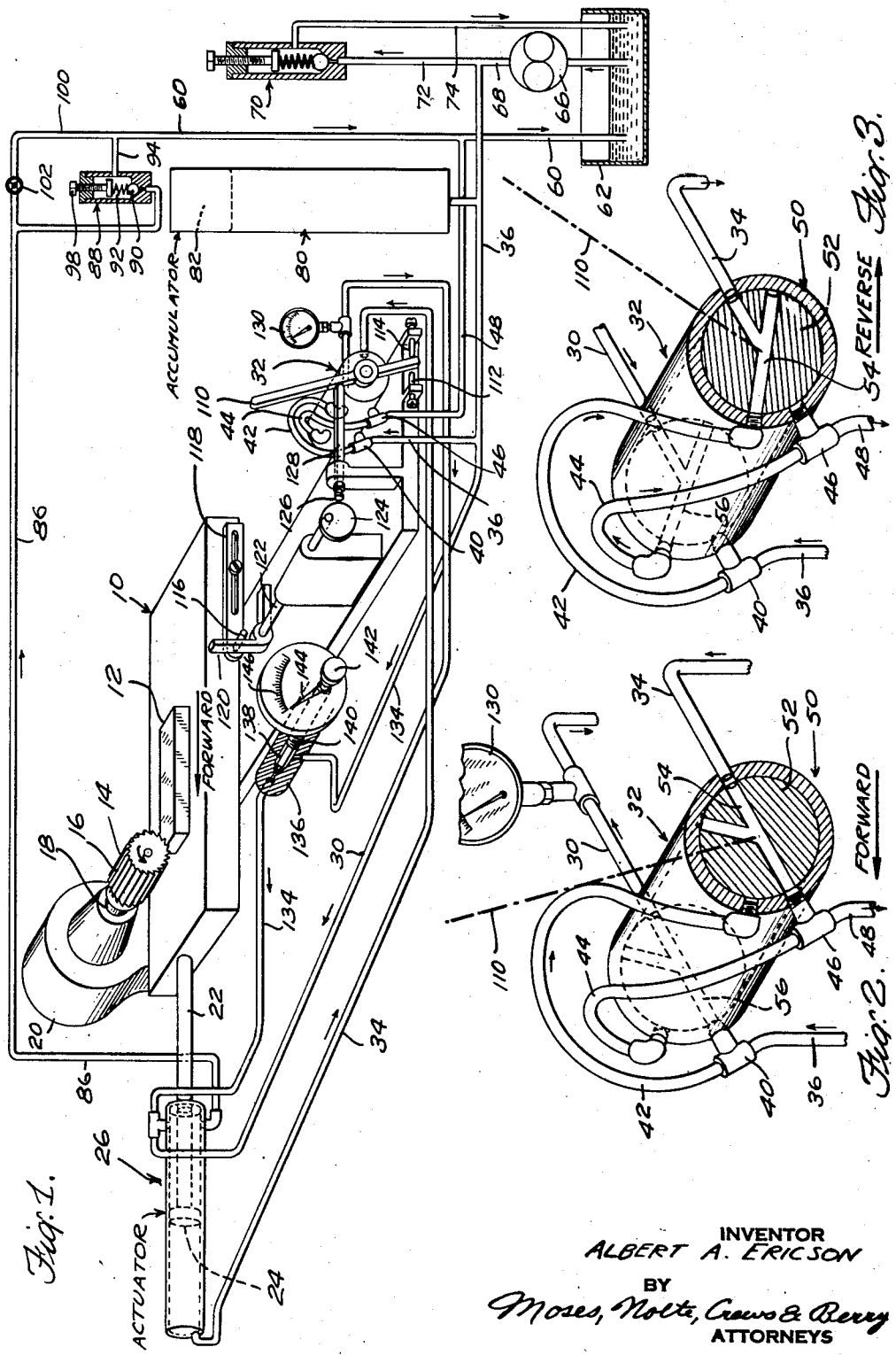
INVENTOR
ALBERT A. ERICSON
BY
Moses, Nolte, Crews & Berry
ATTORNEYS Patented Aug. 4, 1953

2,647,371

UNITED STATES PATENT OFFICE 2,647,371

HYDRAULIC MACHINE TOOL DRIVE

Albert A. Ericson, Massapequa Park, N. Y., assignor to The Farmingdale Corporation, a corporation of New York Application December 9, 1944, Serial No. 567,438

2 Claims. (Cl. 60—51)

This invention relates to hydraulic drives for machine tools. Hydraulic drives present many advantages over the mechanical drives more commonly used, in that they present greater mechanical simplicity, require less parts, result in saving power due to elimination of friction of gears, feed screws, etc., provide for simplicity of control thereby reducing operator fatigue, and also permit of an infinite number of rates of feed depending upon the adjustment of the control valve as distinguished from the limited number of feeds obtainable by mechanical means such as change gears, or other rate of feed adjusting devices. The advantages inherent in the hydraulic feeds have not, however, been fully secured in existing hydraulic feed devices, because satisfactory feed control has not been achieved by such devices. This has been due in part to the fact that the liquid medium used for transmitting the hydraulic power is substantially incompressible resulting in over rigidity of drive, and to the fact that if excess pressure were provided, as is necessary to permit of efficient operation, such pressure could not be satisfactorily controlled or prevented from building up to a point resulting in a breakage and injury to tools, machines or parts, whenever any abnormality in operating conditions occurred.

The objects of the present invention are to overcome the defects heretofore encountered in utilizing hydraulic feeds for machine tools, and to enable the full advantage to be taken of the greater adaptability and simplicity of hydraulic feeding means.

More specifically it is an object of the invention to provide a hydraulic drive which will function to bring about cutting action between the cutting element of the tool and the work at the greatest possible speed consistent with proper and safe operation.

It is also an object to provide a drive which will provide a maximum rate of feed without excessive wear on the tool or cutter.

It is also an object of the invention to provide a feed which will operate at maximum speed without danger of breakage of the cutter teeth or of cutter arbors, fixtures, or other parts, in the event of special conditions being met with such as unexpected hard spots in the work or other irregularities.

It is also an object of the invention to provide a feed which will compensate for irregularities in the form or condition of the tool or cutter. For instance, as applied to a milling machine, it is impossible to secure absolute uniformity in the grinding of the several teeth of a cutter. Such non-uniformity is compensated for by use of the feed of the present invention so that a maximum rate of feed may be utilized without excessive vibration or danger of breakage.

It is also an object of the invention to provide a feed which will function at a maximum rate of speed, while reducing the vibration upon the parts of the machine tool and upon the work, thereby producing smoother action, better work, and greater life of the machine tool.

Other objects and advantages of the invention will appear as the description proceeds.

In the accompanying drawing:

Figure 1 is a diagrammatic perspective view of one embodiment of the invention, shown for purposes of illustration as applied to a milling machine. It will be apparent that the hydraulic feed system described may be applied to other types of machine tools.

Figure 2 is a perspective phantom view partly in section showing the control valve in position for forward operation of the carriage; and Figure 3 is a similar view showing the valve moved to position for reversing the traverse of the carriage.

Referring to the drawing in detail, 10 is the carriage of the milling machine upon which is secured in any suitable manner a work piece indicated at 12. 14 is a milling cutter having a plurality of teeth 16, the cutter being mounted on an arbor 18 rotated in any suitable manner as is well known in milling machines. The particular example of the system here illustrated and described is applicable to milling operations in which the milling cutter is driven in opposition to the direction of feed of the work piece. That is to say, if the work piece moves during the cutting operation towards the left, as shown in Fig. 1, the cutter moves in counterclockwise direction as indicated by the arrow on the milling cutter. When milling under these conditions there is no tendency for the milling cutter to feed the work piece forward, but the cutting pressure of the cutter tends to oppose the feed of the work piece. If it is desired to mill during the opposite movement of the work piece, so that the cutter rotates in contact with the work piece in the direction in which the work piece is being fed, then arrangements for holding back the movement of the carriage may be used.

In the present example the arbor of the milling cutter is assumed to be mounted to rotate in a stationary support indicated at 20 and the carriage is moved. Obviously if desired, the carriage could be stationary and the milling cutter arbor carried by a movable support, or both carriage and cutter support could be moved. As shown, the carriage 10 is arranged to be reciprocated by means of a piston rod 22 carrying a piston 24, working in a hydraulic cylinder 26. The cylinder, piston and piston rod may be collectively referred to as the "actuator." As will be seen the working stroke of the actuator is that in which the piston moves from right to left, as shown in Fig. 1, the return or idling stroke being from left to right.

The liquid for moving the piston on its working stroke from right to left is supplied to the cylinder through the power line 30 which leads from the cylinder to the control valve 32. The other end of the cylinder is connected to the control valve through a line 34. Liquid under pressure reaches the control valve through a line 36, T 40 and loop 42. The liquid is discharged from the control valve by means of loop 44, T 46, and return pipe 48. Any suitable form of control valve may be utilized. That shown for purposes of illustration comprises a cylindrical casing 50 having a rotary ported plug 52 therein. As illustrated, the plug has two Y-shaped ports therein, one indicated at 54 near one end of the plug, the other at 56 (shown in dotted lines) near the other end of the plug. The casing 50 has suitable ports with which the ports in the plugs are adapted to be brought into registration by partial rotation of the plug. Fig. 2 shows the plug set so as to provide maximum feed of travel of the actuator piston from right to left so as to produce the forward or working stroke of the milling machine carriage. As here illustrated, the liquid under pressure in the pipe 36 passes into the T 40 and through the right angle branch thereof to the port in the casing 50 which in this position of the valve plug is in registration with the appropriate branch of the port 56 at the left hand or further end of the plug, as shown in Fig. 2. The liquid passes straight through the port 56 to the opening in the casing 50 to which the pipe 30 is connected, so that the liquid passes through the pipe 30 to the right hand end of the actuator. As the piston moves to the left (Fig. 1) the liquid in the cylinder at the left side of the piston is released through the pipe 34. This pipe discharges the liquid through the port opening in the near side of the valve plug, as shown in full lines in Fig. 1, the liquid passing out through the T 46 and pipe 48 which discharges the liquid into the pipe 60 which in the example shown leads to the oil reservoir or sump 62.

Fig. 3 shows the position of the valve for reversing the flow. In this case the liquid in the pipe 36 passes straight through the head of the T 40 and through the loop 42 and thence through the port 54 at the near side of the valve, through the pipe 34 to the left hand of the actuator cylinder. The pressure at the right hand side of the piston in the actuator is released through the pipe 30, and valve port 56, loop 44, T 46 and pipe 48.

Liquid under pressure may be supplied to the pressure pipe 36 from any suitable source, for instance the pressure may be supplied from a high pressure main in which a supply of liquid under pressure is constantly maintained by a pressure system such as described in my application for patent Serial No. 567,437, for Hydraulic Feed Systems, filed December 9, 1944 (now Patent 2,526,646, granted Oct. 24, 1950). For purposes of illustration I have here shown a conventional pump for supplying the liquid under pressure. The system illustrated comprises the pump 66 drawing oil from the reservoir 62 and delivering it through the pipe 68 which leads to the pipe 36. A conventional relief valve 70 is connected to the pipe 68 by by-pass 72, any liquid discharged through the relief valve returning to the reservoir through the pipe 74. So long as such a pump operates, a constant volume of liquid is discharged, the liquid not used passing back to the reservoir through the relief valve, and the maximum pressure being determined by the setting of the relief valve. Such a system operates to maintain an adequate supply of liquid at a pressure greater than that which it is actually desired to use, the actual pressure to be used being determined by the setting of the control valve 32, and by the adjustment of a second relief valve to be described. The maximum pressure to be maintained at the source is determined by the nature of the work to be done. For driving most machine tools I prefer to provide pressure at the source on the order of about 600 lbs. per sq. in.

In the construction illustrated an accumulator 80 is provided which is connected with the pressure supply line. This accumulator comprises a closed vessel in which air is trapped in the top as indicated at 82, forming a cushion of air under pressure. The provision of an accumulator in the pressure supply is an important feature of my invention, as it provides a cushion. It takes up shocks due to action of the tool upon the work piece, and prevents too rigid action which would otherwse be caught by the incompressible nature of the hydraulic actuating liquid. The accumulator 80 is preferably connected to the supply line 36 near the control valve, but in advance of the control valve, that is, between the valve and the source of the pressure, rather than between the valve and the actuator. The location of the accumulator at this side of the control valve is advantageous in that the control valve acts as a restriction preventing too elastic or free action of the accumulator. Surges of pressure transmitted back to the accumulator from the actuator are restricted by having to pass through the control valve, and the amount of this restriction is proportionate to the amount of the opening of the control valve. Thus the action of the accumulator is proportional to the actual flow of liquid being used. Too free an action of the accumulator is not desired, because it makes the feed of the machine too elastic and might produce a tendency to "bounce," so to speak. Such action however is controlled if the flow of liquid to and from the accumulator is properly restricted. If suitable means are taken for restricting the flow to the accumulator, the latter may be located at another location than that described, for instance, between the control valve and the actuator.

While the size of the accumulator may be varied, it has been found that an accumulator having a capacity in the neighborhood of four times the capacity of the actuator cylinder will give satisfactory results.

An important feature of my invention consists in the provision of means by which tooth loading or pressure on the cutting tool may be regulated so as to prevent an excess of pressure between the tool and work piece which might result in breakage of the tool, undue tool wear or other injury. In the construction illustrated, this is accomplished by providing a relief valve for relieving any pressure greater than a given maximum which might otherwise occur in the actuator. As shown, a pipe 86 is connected to the right hand end of the actuator cylinder and leads to a relief valve 88. If excessive pressure occurs, it will lift up the valve 90 against the pressure of the spring 92 and permit the pressure to be relieved through the pipe 94 leading to the pipe 60 which discharges into the reservoir 62. The pressure at which the valve 90 will act can be regulated by the screw 98 which regulates the tension of the spring 92. By properly adjusting the screw 98 this pressure may be regulated with desired accuracy to an amount chosen as the safe pressure which the milling machine or other tool will stand without breakage or injury. No greater pressure can be applied to the actuator piston than is provided for by this setting, because as soon as the pressure in the actuator reaches this amount, a further increase is prevented.

A by-pass pipe 100 controlled by a bleeder valve 102 may be conveniently provided around the relief valve 88. This is used merely when there may be air in the system, as may occur after a shut down or disconnection of any of the apparatus for repair or otherwise.

In a system of the character described, it will be understood that the maximum available pressure, whether such pressure be supplied by pump 66 or by a pressure feed line, will ordinarily be greater than that needed to produce the desired feed between the tool and the work. The desired rate of feed to produce maximum safe tool loading is secured by setting the control valve so as to throttle down the pressure until the desired rate of feed is attained. As the rate of feed is controlled by a throttling action of the valve, it depends upon the rate of flow of the liquid through the valve to the actuator. The valve throttles and reduces the pressure until the correct rate of flow is secured. This is the rate of flow necessary to produce a normal rate of feed between the tool and work against normal resistance. If the resistance encountered by feeding the tool through the work is increased, as for instance if a hard spot in the metal is encountered, then the rate of feed tends to be decreased, which results in the slowing up of the piston in the actuator, and a slowing up of the rate of flow of the liquid through the control valve. This results in a backing up of the pressure, because the throttling effect of the valve depends upon the rate of flow. The pressure at the two sides of the control valve therefore tends to equalize and the pressure in the pipe 30 and the actuator cylinder tends to increase until it approaches the pressure on the other side of the control valve in the high pressure line 36.

This characteristic action of a throttled hydraulic system has been a source of great difficulty in previous hydraulic machine tool drives, because, owing to the liquid being substantially incompressible, the action has been too "hard" or rigid, and increase in pressure has been so sudden when obstruction is encountered that damage is sure to result. Furthermore, even in the normal operation of a machine tool, particularly in the case of a multi-toothed tool such as a milling cutter, the operation has been subject to excessive vibration unless feeds were kept very slow.

The present invention overcomes the objections to previous hydraulic feeds in two ways, namely, by the use of the accumulator and of the tool loading relief valve. The action of the accumulator is to prevent the sudden effects of an increase in pressure applied to the actuator, and to soften the effects of all impacts. Thus in the case of the milling cutter, for instance, the impact of every tooth as it contacts the work is in effect cushioned in such a way that vibrations due to successive engagements of the teeth are taken up by the accumulator, instead of by the rigid parts of the machine, and a very smooth operation results with practically no vibration being observable even when very heavy cuts are being taken. This greatly lengthens the life of the machine. It also results in better work being done, because vibrations are reflected in the character of the work. In case of a hard spot in the work, the shock produced by the encounter of the tooth with such hard spot is immediately transmitted back to the accumulator where the effect is cushioned, thereby avoiding possible breakage or other damage. The cushioning effect of the accumulator also is very valuable in preventing shocks or vibrations due to irregularities of the teeth of the cutter, or unequal pressure which may be produced by the arbor being slightly eccentric, as may occur as the machine wears. Owing to the fact that the effect of irregularities in the teeth is cushioned in this manner, the precision requirements in cutter grinding may be lowered, resulting in economy in maintenance of the cutters. Less shock on the teeth of the cutters also reduces wear and the cutters require grinding or replacement at less frequent intervals.

The use of the tool loading relief valve 88 is also an important safety factor in preventing overloading of the tool, and breakage of or damage to the parts. If the excessive resistance encountered by the tool is only momentary, the cushioning effect of the accumulator may be sufficient to take care of the condition, but if the condition continues so that the pressure rises to an extent sufficient to open the relief valve, then some of the liquid will be passed by that valve. The valve will thus absolutely prevent a pressure condition from continuing to exist in which a greater pressure is applied to the actuator and consequently to the tool than that provided for by the initial setting of the valve.

The present invention, owing to the described flexible action of the hydraulic feed, permits a rate of feed to be employed which is a maximum for the most favorable conditions of operation, because the safety factors introduced prevent ill effects from following upon increase in resistance encountered by the tool. For example, in the case of milling it frequently happens that as the cutter begins its cut it will sweep over a very small corner of the work, and perhaps only one or two teeth of the cutter will be engaged at one time. Under these conditions the resistance is light and a somewhat deeper cut may safely be taken. As more teeth become engaged, however, greater pressure is required and the increase in the resistance will slightly decrease the rate of feed. This will result in an increased application of pressure, so that a sufficient rate of feed will be maintained, and this may be accomplished without shock or vibration owing to the accumulator action, and also, due to the action of the tool loading relief valve, without danger of increasing the pressure beyond a safe maximum. Similar results may be achieved in the case of other machine operations than milling. For instance, in the case of a turning operation with a forming cutter, a rapid feed may be maintained without shock or danger of breakage, as the cutter moves more and more deeply into the work with an increasing area of cutting engagement.

The control valve may be actuated in any suitable manner as by means of a hand lever 110. Adjustable stops 112 and 114 may be provided for limiting the movements of the hand lever at positions for full speed forward and full speed in reverse. In some instances it may be desired to use a high speed for feeding the work up to the cutter, and then slowing down the speed during the machining operation. Various means may be used for this purpose. As illustrated a pin 116 is mounted on a slide 118 adjustably secured to the carriage, this pin engaging a trip rocker 120 mounted on a shaft 122 which carries on its other end a cam 124. This cam engages an adjustable contact screw 126 on a slide 128, the end of which engages the control valve lever 110. When the slide 128 is moved to the left (Fig. 1) the control valve lever may be moved all the way over to the left until its lower end engages the adjustable stop 114. In this position the carriage will be fed at its maximum speed as determined by the setting of the stop 114. With this setting the carriage 10 will travel to the left at its higher rate of speed. When, however, the pin 116 reaches the rocker 120 it will rock the same through approximately 90°, thereby throwing the cam 124 so that the latter will engage the screw 126 on the end of the slide 128 and push the slide a little way to the right. This will push the valve lever 110 a little way to the right and will partially close the control valve so as to throttle down the supply of liquid to the actuator and slow down the travel of the carriage. By adjusting the screw 126, the amount of closing of the control valve can be carefully set so that the desired normal speed for feeding the work under the cutter during the machining operation can be regulated. At the same time the screw 98 will be adjusted so as to regulate the relief valve to prevent the building up of pressure in the actuator to a maximum greater than that which will produce a safe loading on the tool. These two adjustments control the normal rate of cutting feed and the maximum safe tool loading, and permit a rate of feed to be used which will approach very closely to the maximum tool loading permissible without breakage of the tool. A very high rate of cutting feed may be used with this arrangement without danger.

A gauge 130 is conveniently provided in the line between the control valve and the actuator so as to indicate the pressure being applied to the actuator.

As an important object of the present invention is to enable the machining of numbers of work pieces to be carried on at the maximum speed. I have shown means in the present system by which compensation may readily be made for wear or dulling of the tool. In production jobs necessitating the machining of a large number of similar parts, the machine is adjusted at a safe rate of feed to give good efficiency with a sharp tool. As the production proceeds it is frequently noted that there will be a slight slowing up in the rate of production as the tool gradually gets dull. Eventually, of course, the tool will have to be replaced or resharpened, but before this occurs it is desirable to keep the rate of production up as nearly as possible to its normal standard. I have found that this can be done by slightly increasing the pressure fluid supplied to the actuator as long as this slight increase does not exceed the maximum for which the relief valve 88 is regulated. It is desirable to supply this increased pressure without changing the more or less delicate adjustment of the main control valve and its actuating parts such as the stop pin 116, rocker 120, cam 124, slide 128 and contact screw 126. In the construction shown I accomplish the desired result by providing a separate line 134 which may be termed a "booster" line leading from the pressure line 36 to the actuator. In the booster line is placed a valve 136 which may be termed the "booster" valve, and which may be cracked open to permit a small amount of liquid under pressure to pass directly from the line 36 to the actuator without going through the main control valve 32. The booster valve may be of any suitable construction, that illustrated comprising a needle valve 138 having a screw stem 140 which may be rotated by a knob 142. A hand 144 working over a scale 146 is provided for convenience of adjustment. As the machining process slows up during the course of the production run, the knob 142 is turned slightly so as to open the valve a little way and permit enough fluid under pressure to pass to the actuator to compensate for the wear of the tool. As soon as a point is reached where the pressure cannot be further built up, owing to its being relieved through the relief valve 88, then the operation must be stopped and a new cutter be put into service. The valve 136 is then closed and the system is operated as in the beginning, no resetting of the main control valve being required.

While I have illustrated and described in detail certain preferred forms of my invention, it is to be understood that changes may be made therein and the invention embodied in other structures. I do not, therefore, desire to limit myself to the specific construction illustrated, but intend to cover my invention broadly in whatever form its principles may be utilized.

What is claimed is:

1. A hydraulic feed for machine tools comprising an actuator for bringing about relative feed between the tool and the work, a source of liquid under pressure, a pressure line leading from the pressure source to the actuator, a main control valve in said line movable between predetermined settings for each actuation of the actuator, said actuator in said settings restricting the flow of liquid through said line, adjustable means for adjusting such predetermined settings, and means for supplementing the supply of liquid under pressure to the actuator without changing the established setting of said adjustable means comprising a booster line by-passing the main control valve for conducting liquid under pressure to the actuator and a manually-operated booster valve actuable to permit a flow of liquid through said booster line to the actuator to increase the power of the actuator by supplementing the flow to the actuator through the main control valve.

2. A hydraulic feed for machine tools comprising an actuator for bringing about relative feed between the tool and the work, a source of liquid under pressure, a pressure line leading from the pressure source to the actuator, a main control valve in said line movable between predetermined settings for each actuation of the actuator, said actuator in said settings restricting the flow of liquid through said line, adjustable means for adjusting such predetermined settings, means for supplementing the supply of liquid under pressure to the actuator without changing the established setting, said adjustable means comprising a booster line by-passing the main control valve for conducting liquid under pressure to the actuator and a manually-operated booster valve actuable to permit a flow of liquid through said booster line to the actuator to increase the power of the actuator by supplementing the flow to the actuator through the main control valve, and a relief valve connected to the actuator by a connection independent of the control valve and the booster valve for relieving excess pressure in the actuator.

ALBERT A. ERICSON.

References Cited in the file of this patent

UNITED STATES PATENTS

| Number | Name | Date |
|---|---|---|
| 1,250,564 | Crain | Dec. 18, 1917 |
| 1,299,883 | Warren | Apr. 8, 1919 |
| 1,582,468 | Heald et al. | Apr. 27, 1926 |
| 1,616,841 | Beebe | Feb. 8, 1927 |
| 1,791,013 | Rudolph | Feb. 3, 1931 |
| 1,897,032 | Ernst | Feb. 14, 1933 |
| 1,904,112 | Achard | Apr. 18, 1933 |
| 1,905,133 | Bishop et al. | Apr. 25, 1933 |
| 2,004,793 | Montgomery | June 11, 1935 |
| 2,005,731 | Ernst et al. | June 25, 1935 |
| 2,170,890 | Allen | Aug. 29, 1939 |
| 2,236,467 | Clench | Mar. 25, 1941 |
| 2,419,374 | Shartle | Apr. 22, 1947 |
| 2,449,889 | Eisen | Sept. 21, 1948 |